United States Patent
Goux et al.

(10) Patent No.: US 7,335,415 B1
(45) Date of Patent: Feb. 26, 2008

(54) TEARAWAY ADHESIVE TAPE ON NONWOVEN SUPPORT

(75) Inventors: Alain Goux, Nievroz (FR); Rémi Barnet, Chambery (FR)

(73) Assignee: Scapa France, Bellegrade sur Valserine (FR)

( * ) Notice: Subject to any disclaimer, the term of this patent is extended or adjusted under 35 U.S.C. 154(b) by 221 days.

(21) Appl. No.: 10/069,126

(22) PCT Filed: Sep. 1, 2000

(86) PCT No.: PCT/FR00/02424

§ 371 (c)(1),
(2), (4) Date: Jul. 24, 2002

(87) PCT Pub. No.: WO01/16245

PCT Pub. Date: Mar. 8, 2001

(30) Foreign Application Priority Data

Sep. 2, 1999 (FR) .................................. 99 11016

(51) Int. Cl.
B32B 7/12 (2006.01)
B32B 5/02 (2006.01)
B32B 27/04 (2006.01)
D04H 1/46 (2006.01)

(52) U.S. Cl. ............... 428/343; 442/402; 442/150; 442/151

(58) Field of Classification Search ........... 428/343; 442/327, 402, 66, 150, 151
See application file for complete search history.

(56) References Cited

U.S. PATENT DOCUMENTS

| | | | |
|---|---|---|---|
| 4,302,500 A | 11/1981 | Flora | |
| 4,833,179 A * | 5/1989 | Young et al. | 522/183 |
| 5,232,838 A * | 8/1993 | Nelson et al. | 435/30 |
| 5,334,686 A * | 8/1994 | Ando et al. | 526/307.7 |
| 5,496,603 A | 3/1996 | Riedel et al. | |
| 5,631,073 A | 5/1997 | Riedel et al. | |
| 5,679,190 A | 10/1997 | Riedel et al. | |
| 5,916,393 A * | 6/1999 | Shaffer et al. | 156/82 |
| 6,200,677 B1 * | 3/2001 | Richardson et al. | 428/343 |

FOREIGN PATENT DOCUMENTS

| | | |
|---|---|---|
| DE | 1957410 | 3/1963 |
| DE | 19523494 | 1/1997 |
| DE | 29819014 | 4/1999 |
| EP | 0668336 | 8/1995 |
| EP | 0716136 | 6/1996 |
| EP | 0716137 | 6/1996 |
| EP | 0995782 | 4/2000 |
| EP | 0995783 | 4/2000 |
| JP | 2-163183 | 6/1990 |
| WO | 96/17027 | 6/1996 |

OTHER PUBLICATIONS

English Language Abstract of EP 0 942 057.
"Tesa Industrie-Klebebänder", 4 pages.
Tesaband 51608: PET-Villes für manuell gefertigte Fahrzeug-Innenraum-Käbelsatze, 1 page.
"Zwölf Rasterelektronenmikroskopaufnahmen eines Abschnitts des Klebebands teas 51608", 6 Pages.
"Handbook of Pressure Sensitive Adhesive Technology", by Donatas Satas, 1989.
"Customer Visit Report, First Contact, Presentation of Tesa 51608".
Fachbuch, "Vliesstoffe", herausgegeben von Joachim Lünenschlob und Wilhelm Albrecht, Georg Thieme Verlag Stuttgart, 1982.

* cited by examiner

Primary Examiner—Lynda Salvatore
(74) Attorney, Agent, or Firm—Greenblum & Bernstein, P.L.C.

(57) ABSTRACT

The invention concerns a nonwoven support, in the form of a felt or needle punched product, having a thickness ranging between 0.3 and 1 mm and a surface mass of fibres ranging between 70 and 120 g/m$^2$, and the fibres are embedded in the adhesive over part of the support thickness. The tear strength of the adhesive tape is less than 15 N. The invention is useful for strapping bundles of cables in motor vehicle construction.

23 Claims, No Drawings

TEARAWAY ADHESIVE TAPE ON NONWOVEN SUPPORT

The invention relates to adhesive tapes in general, and in particular to those used for taping up bundles of cables, more particularly in car manufacture.

For a long time, adhesive tapes have been known which are referred to as "anti-noise", having a support of needle-bonded felt of a thickness of generally more than 1 mm and of a surface mass of generally more than 120 g/m². The anti-noise property is important in the car sector because it reduces noise caused by the rubbing of the bundles of cables against the car body and other parts of the vehicle. In order to avoid excessive penetration of the adhesive into this type of support, the adhesive is conventionally applied by transfer, i.e. it is first applied as a coating to a backing formed by an anti-adhesive strip of the same width as the support, after which the support is pasted on to the adhesive by lamination. The backing also prevents fluffing of the support as the tape is unrolled. However, it must be disposed of as the product is used. Moreover, these adhesive tapes are not capable of being torn off by hand and therefore require the use of a cutting tool.

EP-A-0 668 336, EP-A-0 716 136, EP-A-0 716 137 and WO-A-9617027 describe adhesive tapes comprising a support of non-woven stitched textile fibres, in particular of the type known as "Malivlies" or "Maliwatt", intended in particular for the taping of electric cables in the car industry. The anti-noise properties of these adhesive tapes are less good than those of tapes with a felt support as mentioned above, as Table 1 shows, which gives the sound level (weighting A) determined for different adhesive tapes according to a method derived from the BMW method (base noise 30 dBA, sound level without adhesive tape 80 dBA).

JP-A-2 163 183 describes an anti-noise adhesive tape which can be torn off by hand for taping up bundles of cables in the car industry, comprising a textile support and a pressure-sensitive adhesive. The exact structure of the support is not described.

Also known are adhesive tapes having a brushed knitted support. These products are expensive to realise and the penetration of the adhesive into the support is considerable. Moreover, they cannot be torn off by hand.

The object of the invention is to realise an adhesive tape which is economical, easy to use, and has good noise-reducing properties.

A further object is to supply such an adhesive tape which can be torn off by hand.

The subject of the invention is in particular an adhesive tape having a fibrous non-woven support in the form of a felt or a needle-bonded fabric and a coating of adhesive covering one face of the support.

According to the invention, this adhesive tape is rolled up with direct contact between the adhesive and the support of an adjacent winding, the support having a thickness of between 0.3 and 1 mm and a surface mass of fibres of between 70 and 120 g/m², and the fibres being immersed in the adhesive over part of the thickness of the support of between 10 μm and 0.5 mm.

Optional, complementary or alternative features of the adhesive tape according to the invention are given below:

The thickness of the support is between 0.4 and 0.7 mm.
The surface mass of fibres of the support is between 80 and 110 g/m².
It has a transverse tearing effort of less than 15 N according to the AFERA 4007 method.
The support fibres are formed at least substantially of polyester and/or viscose fibres.
The ratio by mass of viscose to polyester in the fibres is between 20:80 and 50:50 and preferably between 40:60 and 50:50.
The support contains a proportion of at least 20% by mass of more easily meltable fibres than polyester and/or viscose fibres, capable of interlinking by thermal treatment in order to reinforce the cohesion of the support.
The proportion of the more easily meltable fibres is between 5 and 15% by mass.
The adhesive is sensitive to pressure.
The face of the support opposite the adhesive is calendered.
The face of the support opposite the adhesive is coated with an anti-adhesive varnish.

The invention also relates to a method for forming an adhesive tape such as that defined above, wherein the adhesive is applied to the support in the liquid state and is then brought to the solid state by appropriate treatment, e.g. by refrigeration, drying or irradiation.

Advantageously, the adhesive is applied with a viscosity of between 30,000 and 150,000 cP and preferably between 50,000 and 100,000 cP.

The invention further provides the use of the adhesive tape defined above for taping up bundles of cables, in particular in car manufacture.

The needle-bonded lightweight felt or felt forming the support of the adhesive tape according to the invention can be obtained by any known technique in the textile industry and in particular by means of carders. Although one can use any textile fibres commonly used in the manufacture of felts and needle-bonded textiles, fibres of polyester and/or viscose are preferred, in particular for use in the car industry. A judicious proportion of these two types of fibre makes it possible to combine good resistance to temperature, favoured by polyester, with good tearability, favoured by viscose. Reasonable traction facilitates tearing by hand.

Advantageously, the support has a tear-resistance by traction of more than 1.5 daN/cm, a modulus at 20% of elongation of more than 0.5 N/cm and an elongation at break of between 50% and 100%. Such a modulus limits shrinkage during coating and during unwinding of the tape.

The incorporation of more easily meltable fibres and their mutual linkage by thermal treatment, particularly during calendering of the support, reduce fluffing during unrolling of the tape and the effort required thereby. A proportion of these fibres not exceeding 20% by mass, and in particular lying between 5 and 15%, preserves the flexibility of the support. Their melting point is preferably between 50 and 170° C. They can be of the vinyl type or a copolymer base derived from polyester, commonly known as "copolyester".

An anti-adhesive varnish, applied in the fluid state, as is known per se, to the face of the support opposite to the adhesive, also permits easy unrolling without fluffing. This effect is confirmed by Table 2, which gives the unrolling effort in Newtons per centimeter width for two adhesive tapes comprising and not comprising such a varnish and being otherwise similar.

The aforementioned calendering is preferably carried out so as to smooth the face of the support opposite the adhesive, with or without easily meltable fibres, e.g. by bringing the cylinder which bears on this face to a suitable temperature. It makes for greater cohesion of the fibres, which limits fluffing.

The partial penetration of adhesive into the support is obtained by direct coating, the adhesive being applied directly to the support, in the liquid state, e.g. in the form of a solution, or of an aqueous solution, or in the molten state, or in the form of a precursor which is then cross-linked by irradiation or thermal treatment. The adhesive can be applied by any known technique, in particular a technique using cylinders and preferably cylinder-to-cylinder transfer. The partial penetration of the adhesive stiffens the support and reduces the transverse tearing effort of the tape relative to that of the non-coated support. This appears in Table 3, which indicates the transverse tearing effort, on the one hand for an adhesive tape according to the invention whose support is composed of 55% polyester fibres and 45% viscose by mass, having a surface mass of 90 g/m², and on the other hand for the same support without adhesive. This is a traction force determined according to the method AFERA 4007, which must be exerted on the tape in the direction perpendicular to the plane thereof, on either side of a notch formed transversely from one edge, in order to tear it from this notch to the opposite side.

The transverse tearing strength of this same support is also given in Table 4, by comparison with a similar support of pure polyester, which confirms the beneficial effect of the viscose on tearability.

The application of adhesive in the liquid state is translated furthermore into various irregularities in the free surface of the layer of adhesive, corresponding to the irregularities in the surface of the support, which reduce the contact surface between the adhesive and the adjacent winding of the support in the rolled tape, thus facilitating unrolling and limiting fluffing which accompanies this action. It is advantageous that the unrolling force does not exceed 3.5 N/cm and preferably 3 N/cm.

The degree of penetration of the adhesive into the support can be controlled by playing on the viscosity of the adhesive and on the presence or otherwise of a powder applied in a known manner to the face of the support receiving the same. Such a powder, e.g. with a polyester or preferably polyethylene base, may be applied in a quantity capable of reaching 70 g/m², and preferably comprised between 10 and 30 g/m².

Such a powder may also be applied, as a supplement to or a replacement of the anti-adhesive varnish, to the face of the support opposite to the layer of adhesive, so as to reduce the unrolling effort.

The viscosity of the adhesive also has an effect on the adhesiveness of the adhesive tape. Table 5 gives the values of adhesiveness on the reverse determined by the AFERA method and by the RENAULT method on two adhesive tapes having the same support and an adhesive of the same final composition, the weight of adhesive and its viscosity at application being different. Obviously, the increase in viscosity makes it possible to increase the adhesiveness, in spite of a decrease in the weight of the adhesive. The unrolling behaviour is not affected.

Table 1 shows that an adhesive tape according to the invention (lightweight felt 90 g) supplies, in spite of a relatively low surface mass of fibres, an anti-noise effect superior to that of known adhesive tapes with supports of the Malivlies and Maliwatt types.

EXAMPLE 1

A needle-bonded lightweight felt is prepared having a surface mass of 90 g/m², composed of 50% polyester fibres, 45% viscose fibres and 5% copolyester fibres having a melting point of less than 170°, calendered at 190° and comprising 20 g/m² of polyethylene powder on the face opposite to the calendered face. Then one applies, over the polyethylene powder, a solution with a base of natural rubber pre-crosslinked in toluene, having a viscosity of 100,000 cP, for a final quantity of adhesive of 64 g/m², and to the calendered face a conventional anti-adherent varnish. The adhesive tape obtained has an immediate unrolling effort of 1.9 N/cm, an adhesiveness to the AFERA backing of 8.4 N/cm and a transverse tearing resistance according to AFERA of 8.56 N.

EXAMPLE 2

One starts with a needle-bonded lightweight felt with a surface mass of 102 g/m² of the same composition as that in Example 1. This lightweight felt receives 40 g/m² polyethylene powder and is calendered at 190° C. on its opposite face to that covered with powder. An anti-adhesive varnish and a layer of adhesive are then applied in the same manner as in Example 1, the final quantity of adhesive being 65 g/m². The resultant adhesive tape has an immediate unrolling effort of 1 N/cm, an adhesiveness to the backing according to AFERA of 4.4 N/cm and a transverse tearing effort of 7.86 N.

TABLE 1

| Adhesive tape | Acoustic level |
|---|---|
| Lightweight felt 150 g/m² + adhesive 50-80 g/m² | 56.0 |
| Lightweight felt 90 g/m² + adhesive 50-80 g/m² | 63.5 |
| Malivlies 90 g/m² + adhesive 50-80 g/m² | 65.5 |
| Maliwatt 130 g/m² + adhesive 120 g/m² | 67.3 |
| Maliwatt 130 g/m² + adhesive 200-250 g/m² | 65.7 |
| Maliwatt 90 g/m² + adhesive 50-80 g/m² | 71.8 |

TABLE 2

| Anti-adhesive varnish | Unrolling effort (N/cm) |
|---|---|
| Absent | 4.5 |
| Present | 1.2 |

TABLE 3

| Tape | Transverse tearing effort (N) |
|---|---|
| Support without adhesive | 15.2 |
| Support + adhesive | 8.6 |

TABLE 4

| Fibres of support | Transverse tearing effort (N) |
|---|---|
| 100% polyester | 18.0 |
| 55% polyester 45% viscose | 15.2 |

TABLE 5

| | | |
|---|---|---|
| Weight of adhesive (g/m²) | 55 | 64 |
| Viscosity (cP) | 103,000 | 52,000 |
| Adhesiveness/backing AFERA (N/cm) | 17.4 | 12.2 |
| Adhesiveness/backing RENAULT (N/cm) | 2.9 | 1.8 |
| Unrolling effort (N/cm) | 1.3 | 1.2 |

The invention claimed is:

1. An adhesive tape comprising:
   a non-woven fibrous support comprising felt and/or needlebonded fabric;
   the support having a thickness of 0.3 to 1 mm and a surface mass of fibers of 70 to 120 g/m$^2$;
   a layer of adhesive covering one face of the support;
   a polyethylene and/or polyester based powder applied to the adhesive face of the support;
   the fibers being immersed 10 μm to 0.5 mm in the adhesive; and
   the tape being rolled up with direct contact between the adhesive and the support.

2. The tape of claim 1, wherein the powder is applied in an amount of 10 to 70 g/m$^2$.

3. The tape of claim 1, wherein the thickness of the support is 0.4 to 0.7 mm.

4. The tape of claim 1, wherein the surface mass of fibers of the support is between 80 and 110 g/m$^2$.

5. The tape of claim 1, which exhibits a transverse tearing effort of less than 15 N according to the AFERA 4007 method.

6. The tape of claim 1, wherein the support has a tear resistance by traction of greater than 1.5 daN/cm, a modulus at 20% elongation of more than 0.5 N/cm, and an elongation break of 50% to 100%.

7. The tape of claim 1, wherein the fibers comprise polyester and/or viscose.

8. The tape of claim 1, wherein the fibers comprise viscose and polyester in a mass ratio of 20:80 to 50:50.

9. The tape of claim 1, wherein the fibers comprise viscose and polyester in a mass ratio of 40:60 to 50:50.

10. The tape of claim 1, wherein the fibers comprise up to 20% by mass of fibers which are more easily melted than polyester and/or viscose fibers and which are capable of interlinking by thermal treatment to strengthen the cohesion of the support.

11. The tape of claim 10, wherein the fibers comprise 5% to 15% by mass of the more easily melted fibers.

12. The tape of claim 10, wherein the more easily melted fibers comprise vinyl fibers and/or copolyester fibers.

13. The tape of claim 1, wherein the adhesive is sensitive to pressure.

14. The tape of claim 1, wherein the face of the support opposite to the adhesive is calendered.

15. The tape of claim 1, wherein the face of the support opposite to the adhesive is covered with an anti-adhesive varnish.

16. The tape of claim 1, which exhibits an unrolling effort of not more than 3.5 N/cm.

17. A bundle of cables comprising a bundle of cables including the tape according to claim 1.

18. A method of forming an adhesive tape according to claim 1, comprising applying the adhesive as a liquid to the support and then solidifying the adhesive.

19. The method of claim 18, wherein the solidifying comprises at least one of refrigeration, drying, or irradiation.

20. The method of claim 18, wherein a powder and/or varnish is applied to the adhesive side of the support.

21. A method of taping up a bundle of cables comprising taping up the bundle of cables with the tape according to claim 1.

22. The method of claim 21, wherein the bundle of cables comprises a bundle of cables in a motor vehicle.

23. An adhesive tape comprising:
   a non-woven fibrous support comprising felt and/or needlebonded fabric;
   wherein the fibers comprise 50% polyester fibers, 45% viscose fibers, and 5% copolyester fibers having a melting point of less than 170° C., and a surface mass of 90 to 102 g/m$^2$; and comprising 20 to 40 g/m$^2$ of polyethylene powder on the adhesive face of the support;
   the support having a thickness of 0.3 to 1 mm and a surface mass of fibers of 70 to 120 g/m$^2$;
   a layer of adhesive covering one face of the support;
   the fibers being immersed 10 μm to 0.5 mm in the adhesive; and
   the tape being rolled up with direct contact between the adhesive and the support.

* * * * *